US008503514B2

(12) United States Patent
Anvari

(10) Patent No.: US 8,503,514 B2
(45) Date of Patent: Aug. 6, 2013

(54) HIGH SPEED SWITCH WITH DATA CONVERTER PHYSICAL PORTS

(75) Inventor: Kiomars Anvari, Alamo, CA (US)

(73) Assignee: Integrated Device Technology Inc., San Jose, CA (US)

( * ) Notice: Subject to any disclaimer, the term of this patent is extended or adjusted under 35 U.S.C. 154(b) by 429 days.

(21) Appl. No.: 12/687,821

(22) Filed: Jan. 14, 2010

(65) Prior Publication Data

US 2011/0170577 A1 Jul. 14, 2011

(51) Int. Cl.
H04B 1/38 (2006.01)
(52) U.S. Cl.
USPC ........... 375/219; 375/220; 375/222; 375/259; 375/295; 375/316; 455/39; 455/73; 455/91; 455/130; 370/272; 370/273; 370/275; 370/276; 370/278; 370/297; 370/352; 370/353; 370/354; 370/355; 370/356; 370/357; 370/358; 370/359; 370/360; 370/366; 341/126; 341/144; 341/146; 341/155; 341/159
(58) Field of Classification Search
USPC .............. 375/219, 220, 222, 259, 295, 316; 455/39, 73, 91, 130; 370/272, 273, 275, 370/276, 278, 297, 352–360, 366; 341/126, 341/144, 146, 155, 159
See application file for complete search history.

(56) References Cited

U.S. PATENT DOCUMENTS

| 6,700,886 | B2 * | 3/2004 | Mullaney et al. | 370/365 |
| 6,721,313 | B1 * | 4/2004 | Van Duyne | 370/386 |
| 6,995,594 | B2 * | 2/2006 | Buchwald et al. | 327/248 |
| 2006/0107154 | A1 * | 5/2006 | Bansal et al. | 714/738 |
| 2011/0122011 | A1 * | 5/2011 | Ryden et al. | 342/14 |

* cited by examiner

Primary Examiner — Leon Flores
(74) Attorney, Agent, or Firm — Bever Hoffman & Harms, LLP

(57) ABSTRACT

A high-speed switch that includes a switch fabric, and both high-speed serial ports and data converter physical ports. A first set of data converter physical ports may perform analog-to-digital conversions, such that an external analog signal may be converted to a digital input signal on the switch. The converted digital input signal may then be routed through the switch fabric in accordance with a serial data protocol. A second set of data converter physical ports may perform digital-to-analog conversions, such that an internal digital signal received from the switch fabric may be converted to an analog output signal on the switch. The converted analog output signal may then be transmitted to an external destination in accordance with a serial data protocol.

34 Claims, 2 Drawing Sheets

HIGH SPEED SWITCH WITH DATA CONVERTER PHYSICAL PORTS

FIELD OF THE INVENTION

The present invention relates to a high speed switch that includes data converter physical ports that boost performance by providing flexibility, programmability, security and reliability.

RELATED ART

High speed switches and routers typically include a plurality of physical ports, each of which includes a corresponding digital transceiver. Each digital transceiver is capable of receiving a stream of serial digital input data from an external device. Upon receiving serial digital input data, the digital transceiver converts the serial digital input data into parallel digital data using a serializer-deserializer (SERDES) circuit. This parallel digital data is provided to a control circuit, which controls the routing of the parallel digital data in accordance with a particular protocol. In general, the control circuit causes the parallel digital data to be routed through a switch fabric to another physical port of the switch. The digital transceiver associated with this physical port converts the parallel digital data into a stream of serial digital output data, which is provided to an external device.

As described above, conventional high-speed switches typically operate exclusively in response to digital input and output signals. It would be desirable to have a high-speed switch that has the flexibility to operate in response to analog signals as well as digital signals.

SUMMARY

Accordingly, the present invention provides an improved communication system that implements a high-speed switch that includes both high-speed serial physical ports and high-speed data converter physical ports that operate in conjunction with intelligent protocols. As defined herein, intelligent protocols have features to manage signal latency, control and routing through the switch.

A first set of data converter physical ports may perform analog-to-digital conversions, such that an external analog signal may be converted to a digital input signal on the switch. The converted digital input signal may then be routed through the switch fabric to the serial physical ports or other data converter physical ports, in accordance with a serial data protocol. A second set of data converter physical ports may perform digital-to-analog conversions, such that an internal digital signal received from the switch fabric (and originating from the serial physical ports or other data converter physical ports) may be converted to an analog output signal on the switch, in accordance with a serial protocol. The converted analog output signal may then be transmitted to an external destination.

The high-speed switch can be used to implement a base station radio card. In this embodiment, a serial physical port of the high-speed switch receives digital baseband and control signals from a baseband card. The high-speed switch routes the received digital baseband and control signals to a signal processing block (through another serial physical port of the high-speed switch). In response, the signal processing block provides a digital baseband output signal, which is routed through the high-speed switch to a data converter physical port that performs digital-to-analog conversions. This data converter physical port converts the received digital baseband output signal to an analog output signal, which can be transmitted externally using a wired or wireless system. In an alternate embodiment, the high-speed switch can route the digital baseband signal provided by the baseband card directly to the data converter physical port that performs the digital-to-analog conversion (bypassing the signal processing block).

An external receiver circuit can be configured to receive an analog input signal, which is transmitted externally on a wired or wireless system. The external receiver circuit provides the analog input signal to a data converter physical port of the switch that performs analog-to-digital conversions. This data converter physical port converts the received analog input signal to a digital input signal, which is routed through the high-speed switch to the signal processing block (via a serial physical port of the switch). The signal processing block processes the digital input signal, and then forwards this processed digital input signal to the baseband card (through the high-speed switch). Alternately, the digital input signal can be routed through the high-speed switch directly to the baseband card.

In another embodiment, the digital input signal can be routed from the data converter physical port to a serial physical port of the switch. The serial physical port converts the digital input signal into a serial data output signal, which is transmitted to an external device coupled to the serial physical port.

The invention will be better understood by reference to the following detailed description in conjunction with the accompanying drawings.

DETAILED DESCRIPTION

Figure 1:
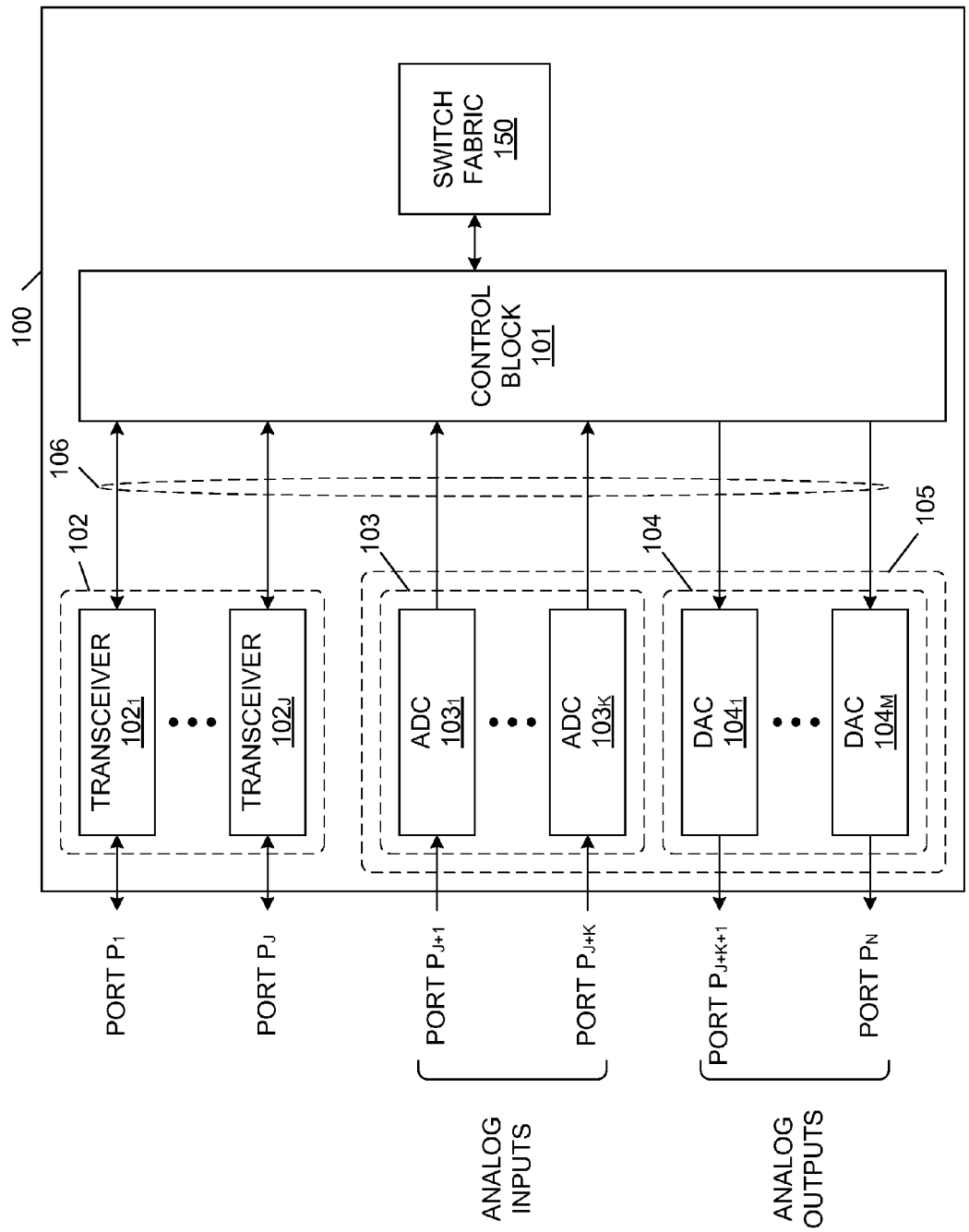
FIG. 1 is a block diagram of a multi-port switch in accordance with one embodiment of the present invention.

FIG. 1 is a block diagram of a high-speed switch 100, which includes high-speed serial physical ports $P_1$-$P_N$. Switch 100 includes the following main functional blocks: control logic block 101, transceiver block 102, data converter block 105 and switch fabric 150. Data converter block 105 includes analog-to-digital (A/D) physical interface 103 and digital-to-analog (D/A) physical interface 104.

As described in more detail below, control logic block 101 and physical ports $P_1$-$P_N$ support one or more serial data protocols, which may include (but not limited to), the following: serial rapid input/output (SRio) protocol, Ethernet protocol, PCI Express (PCIe) protocol, Common Public Radio Interface (CPRI) protocol, and Joint Electron Device Engineering Council (JEDEC) data converter protocol.

The transceiver block 102 includes "J" transceivers $102_1$-$102_J$, each of which can be assigned to an interface port individually. Alternately, more than one of the transceivers $102_1$-$102_J$ can be bundled and assigned to one interface port. The transceivers $102_1$-$102_J$ convert serial digital data (both control and baseband data) received on ports $P_1$-$P_J$ into parallel digital data, which is transmitted on parallel bus system 106. The transceiver block 102 is bi-directional and converts parallel digital data received from switch fabric 150 (via control block 101) into high-speed serial digital data, which is transmitted to serial ports $P_1$-$P_J$. The transceivers $102_1$-$102_J$ in transceiver block 102 transmit and receive digital signals on the corresponding physical ports $P_1$-$P_J$ simultaneously. That is, transceivers $102_1$-$102_J$ may receive input signals on physical ports $P_1$-$P_J$, respectively, and at the same time, transmit output signals on these same physical ports $P_1$-$P_J$. The transceivers $102_1$-$102_J$ are configured to operate in accordance with one or more serial protocols.

The A/D physical interface 103 includes "K" analog-to-digital converters (ADCs) $103_1$-$103_K$. ADCs $103_1$-$103_K$ convert analog input signals received on the respective ports $P_{J+1}$-$P_{J+K}$ into L-bit digital baseband signals (wherein "L" is greater than one). The digital baseband signals provided by ADCs $103_1$-$103_K$ are provided to control block 101, and are routed through switch fabric 150. As described in more detail below, the analog input signals received on ports $P_{J+1}$-$P_{J+K}$ may be provided, for example, by the outputs of radio frequency receivers.

The D/A physical interface 104 includes "M" digital-to-analog converters (DACs) $104_1$-$104_M$. DACs $104_1$-$104_M$ convert L-bit digital baseband signals received from the switch fabric 150 (via control block 101) into analog output signals that are provided to ports $P_{J+K+1}$-$P_N$ (wherein N=J+K+M). As described in more detail below, the analog output signals provided on ports $P_{J+K+1}$-$P_N$ may be routed, for example, to radio frequency transmitters.

Control block 101 supports the one or more serial interface protocols (e.g., SRio, CPRI, PCIe, Ethernet and JEDEC), which are implemented within high-speed switch 100. Control block 101 also controls the routing function, which is implemented by switch fabric 150. Signals provided to control block 101 from ADCs $103_1$-$103_K$ may be routed to transceivers $102_1$-$102_J$ and DACs $104_1$-$104_M$. Signals provided to control block 101 from transceivers $102_1$-$102_J$ may be routed to transceivers $102_1$-$102_J$ and DACs $104_1$-$104_M$. The output signals transmitted from a particular physical port may have been originally received on the same physical port or on a different physical port.

Figure 2:
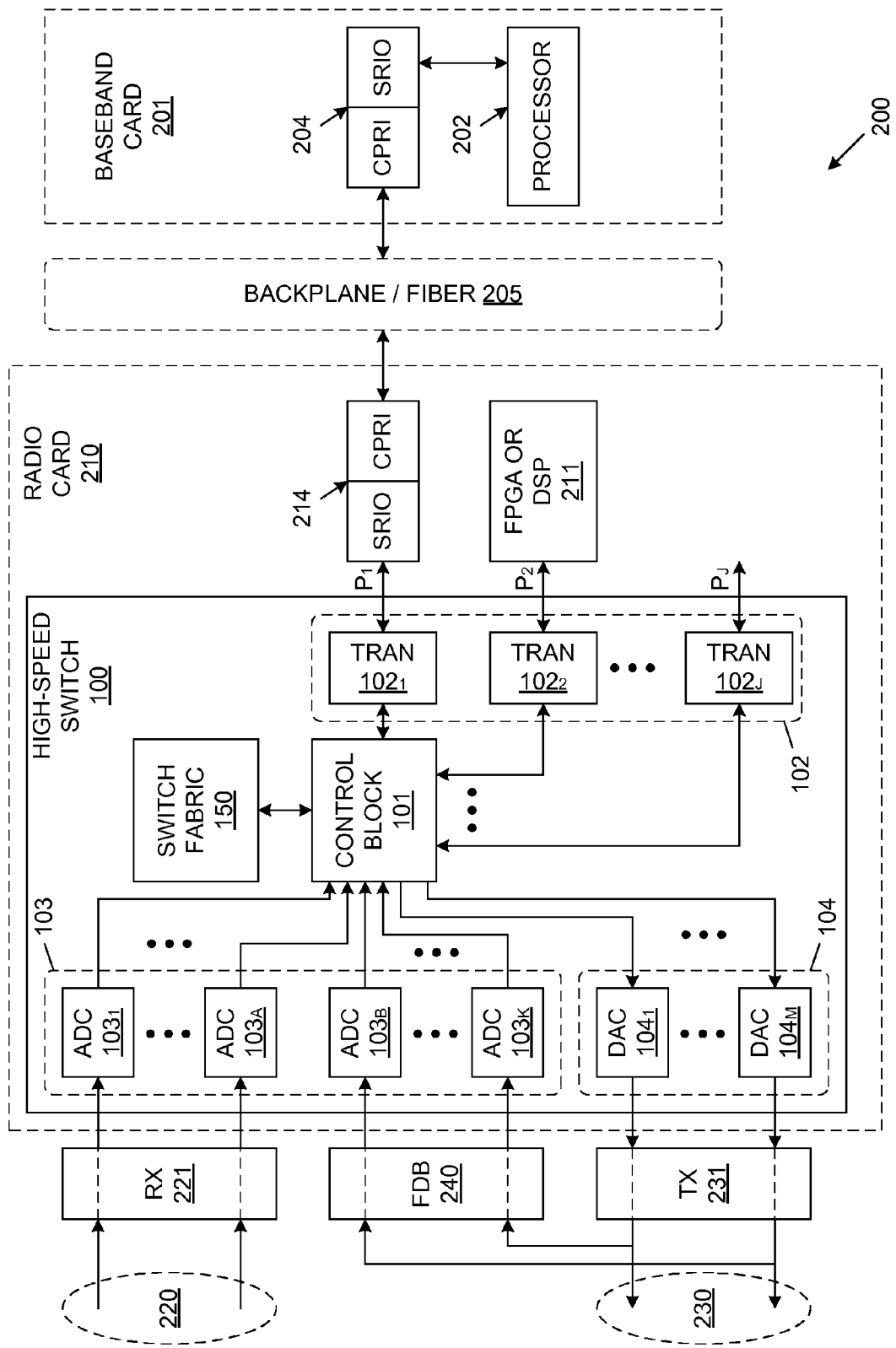
FIG. 2 is a block diagram of a communication system that uses the switch of FIG. 1 in accordance with one embodiment of the present invention.

FIG. 2 is a block diagram of a communication system 200 that implements the high-speed switch 100 in accordance with one embodiment of the present invention. Communication system 200 includes baseband card 201, a backplane or fiber connector 205, radio card 210, receiver medium 220, receiver circuits 221, transmitter medium 230, transmitter circuits 231, and feedback circuits 240. Radio card 210 includes high-speed switch 100, field-programmable gate array (FPGA)/digital signal processor (DSP) 211 and SRio/CPRI interface 214. In the described embodiments, high-speed switch 100 supports the SRio protocol.

Baseband card 201 includes a processor 202, which transmits digital baseband and control output signals in accordance with the SRio protocol to SRio/CPRI interface 204. In response, SRio/CPRI interface 204 performs an SRio-to-CPRI conversion, which allows the baseband and control signals to be transmitted to backplane/fiber connector 205 in accordance with the CPRI protocol. Note that SRio/CPRI interface 204 also performs a CPRI-to-SRio conversion to allow CPRI protocol signals received from backplane/fiber connector 205 to be transmitted to processor 202 in accordance with the SRio protocol.

The SRio/CPRI interface 214 on radio card 210 operates in a manner similar to the SRio/CPRI interface 204 on baseband card 201. That is, SRio/CPRI interface 214 allows digital baseband and control signals to be transmitted to/from backplane/fiber connector 205 in accordance with the CPRI protocol, and allows digital baseband and control signals to be transmitted to/from high-speed switch 100 in accordance with the SRio protocol. The described embodiment implements the CPRI protocol over backplane/fiber connector 205, and the SRio protocol within high-speed switch 100 and processor 202. However, it is understood that these protocols are only exemplary, and that other serial protocols may be used in other embodiments. It is also understood that in yet another embodiment, a single serial protocol may be used to transfer information between processor 202 and high-speed switch 100 through the backplane/fiber connector 205. In yet another embodiment, processor 202 may be located on radio card 210, and be coupled directly to a physical port (e.g., port $P_J$) of high-speed switch 100, thereby eliminating the need for baseband card 201, backplane/fiber connection 205 and SRio/CPRI interface 214.

In the embodiment illustrated by FIG. 2, SRio/CPRI interface 214 is coupled to transceiver $102_1$ of high-speed switch 100 via physical port P. In the described embodiments, transceiver $102_1$ is configured to implement the SRio protocol. However, in other embodiments, transceiver $102_1$ could be configured to implement another serial protocol, in order to match the serial protocol implemented by the processor 202 on baseband card 201.

The baseband and control signals transmitted from processor 202 enter the high-speed switch 100 through transceiver $102_1$, and are provided to control block 101. Note that transceiver $102_1$ performs a serial-to-parallel conversion of the received baseband and control signal. In accordance with one embodiment of the present invention, control block 101 routes these baseband and control signals through switch fabric 150, to transceiver $102_2$. Transceiver $102_2$ performs a parallel-to serial conversion of the received baseband and control signals. FPGA/DSP 211 of radio card 210 is coupled to transceiver $102_2$ via physical port $P_2$. As a result, the baseband and control signals received by transceiver $102_2$ are transmitted to FPGA/DSP 211. In the described embodiments, transceiver $102_2$ is configured to implement the SRio protocol. However, in other embodiments, transceiver $102_2$ could be configured to implement another serial protocol, in order to match the serial protocol implemented by FPGA/DSP 211.

FPGA/DSP 211 processes the received digital baseband signal to create a processed digital baseband signal, which is sent back to the high-speed switch 100 (via transceiver $102_2$), and is routed to D/A physical interface 104 (via control block 101 and switch fabric 150). Transceiver $102_2$ performs a serial-to-parallel conversion of the received digital baseband signal. Processing performed by FPGA/DSP 211 may include, but is not limited to, signal conditioning, filtering, and sample rate conversion. As described in more detail below, the processed (parallel) digital baseband signal is routed to D/A physical interface 104, and is converted to an analog output signal, which is transmitted from high-speed switch 100.

FPGA/DSP 211 also processes the received digital control signal to create a digital response signal, which is sent back to the high-speed switch 100 (via transceiver $102_2$), and is routed to processor 202 (via control block 101, switch fabric 150, transceiver $102_1$, SRio/CPRI interface 214, backplane/fiber connector 205 and SRio/CPRI interface 204).

In an alternate embodiment, control block 101 may route the digital baseband signal received from processor 202 through switch fabric 150, directly to D/A physical interface 104, without involving FPGA/DSP 211. It is also noted that the digital baseband and control signals transmitted from processor 202 to high-speed switch 100 may alternately be routed to other transceivers $102_3$-$102_J$ in transceiver block 102, in a manner known by those skilled in the art.

Each of the DACs $104_1$-$104_M$ in D/A physical interface 104 is capable of receiving a processed (parallel) digital baseband signal from control block 101 (via switch fabric 150). The processed digital baseband signals received by DACs $104_1$-$104_M$ are converted into analog output signals, which are provided to transmitter circuits 231. Transmitter circuits 231 combine the analog output signals provided by DACs $104_1$-$104_M$ with corresponding radio-frequency (RF) carrier signals, thereby creating RF output signals, which are transmitted through transmitter medium 230. Transmitter medium 230 may include a transmitter antenna array that transmits the RF output signals wirelessly over the air. Alternately, transmitter medium 230 may include physical cables or twisted-pair conductors that transmit the RF output signals in a wired manner. The transmitted RF output signals are received at a remote location, and are processed to recreate the digital signals originally received by DACs $104_1$-$104_M$. The manner in which the RF output signals are processed to recreate the original digital signals is described in more detail below (in the description of the operation of receiver medium 220, receiver circuits 221 and ADCs $103_1$-$103_A$).

Receiver medium 220 receives radio-frequency (RF) input signals from external transmission sources (not shown). These RF input signals are similar to the RF output signals provided by transmitter circuits 231. Receiver medium 220 may include a receiver antenna array that receives RF input signals that are transmitted wirelessly over the air. Alternately, receiver medium 220 may include physical cables or twisted-pair conductors that receive the RF input signals in a wired manner. Receiver medium 220 provides the received RF input signals to receiver circuits 221. Receiver circuits 221 perform analog signal processing on the received RF input signals (e.g., filtering the RF carrier signals from the received RF input signals and conditioning the filtered signal) to create analog input signals, which are transmitted to corresponding ADCs $103_1$-$103_A$ of A/D physical interface 103. Each of the ADCs $103_1$-$103_A$ samples the corresponding analog input signal received from receiver circuits 221 in order to create a parallel digital input signal. The parallel digital input signals provided by ADCs $103_1$-$103_A$ are transmitted on parallel bus system 106 to control block 101. Control block 101, in turn, causes the parallel digital baseband signals received from ADCs $103_1$-$103_A$ to be routed through switch fabric 150.

In accordance with one embodiment, the control block 101 causes the parallel digital baseband signals received from ADCs $103_1$-$103_A$ to be routed to FPGA/DSP 211 for digital signal processing (e.g., conditioning, filtering, sample rate conversion, observe the integrity of the received signal). After performing the desired digital signal processing, FPGA/DSP 211 may transmit the resulting processed digital baseband signal to processor 202 (via transceiver $102_2$, control block 101, switch fabric 150, transceiver $102_1$, SRio/CPRI interface 214, backplane/fiber connector 205, and SRio CPRI interface 204). Alternately, FPGA/DSP 211 may transmit the resulting processed digital baseband signal to one (or more) of transceivers $102_2$-$102_J$, wherein the processed digital baseband signal is serialized, using a serial protocol, for transmission to other components that are connected to the switch.

In an alternate embodiment, the parallel digital baseband signals output from ADCs $103_1$-$103_A$ may be directly routed to processor 202 (via control block 101, switch fabric 150, transceiver $102_1$, SRio/CPRI interface 214, backplane/fiber connector 205, and SRio CPRI interface 204), without involving FPGA/DSP 211.

In yet another embodiment, the parallel digital baseband signals output from ADCs $103_1$-$103_A$ may be routed to other transceivers $102_3$-$102_J$ (via control block 101 and switch fabric 150). These transceivers $102_3$-$102_J$ serialize the received parallel digital baseband signals (using a serial protocol), and transmit these serialized signals to other components that are connected to the switch.

In accordance with another embodiment of the present invention, the RF output signals provided by transmitter circuits 231 are also transmitted to feedback receiver circuits 240. Feedback receiver circuits 240 process the RF output signals in the same manner that receiver circuits 221 process the RF input signals. Feedback receiver circuits 240 provide the resulting analog input signals to ADCs $103_B$-$103_K$, which perform an analog-to-digital conversion in the same manner as ADCs $103_1$-$103_A$, thereby creating parallel digital baseband signals, which are transmitted to control block 101. Control block 101 causes the parallel digital baseband signals received from ADCs $103_B$-$103_K$ to be routed to FPGA/DSP 211. FPGA/DSP 211 compares the parallel digital baseband signals received from ADCs $103_B$-$103_K$ with the corresponding parallel digital baseband signals originally transmitted to DACs $104_1$-$104_M$, in order to observe the integrity of the signals transmitted from the transmitter circuits 231. FPGA/DSP 211 may transmit the results of this comparison to processor 202 (via transceiver $102_2$, control block 101, switch fabric 150, transceiver $102_1$, SRio/CPRI interface 214, backplane/fiber connector 205, and SRio CPRI interface 204). The results of this comparison may be used to improve the integrity of signals subsequently transmitted from the transmitter circuits 231.

High-speed switch 100 introduces a significant amount of flexibility, programmability, security and reliability to radio card 210. In accordance with one embodiment, high speed switch 100 supports physical ports $P_1$-$P_N$ with different speeds and compatible protocols. In accordance with another embodiment, different physical ports $P_1$-$P_N$ of high-speed switch 100 may support different protocols.

Although the invention has been described in connection with several embodiments, it is understood that this invention is not limited to the embodiments disclosed, but is capable of various modifications, which would be apparent to one of ordinary skill in the art. For example, it is understood that communication system 200 can be used in any wireless or wired communication network, including, but not limited to, wireless cellular, Personal Communication System (PCS), wireless Local Area Network, Wireless Wide Area Network, WiMax, Video and Audio Wireless Broadcasting, line of sight microwave, military, optical, and satellite communication systems. It is also understood that in the communication system 200 of FIG. 2, additional peripheral devices could be connected to transceivers $102_3$-$102_J$, (i.e., physical ports $P_3$-$P_J$) thereby allowing these additional peripheral devices to communicate through high-speed switch 100. Thus, the present invention is only intended to be limited by the following claims.

I claim:

1. A communication system comprising:
   a switch that includes:
   a switch fabric;
   control logic that controls the transmission of digital signals through the switch fabric;
   a transceiver block comprising one or more transceivers, each transmitting digital signals between the control logic and a corresponding external device, and wherein each of the one or more transceivers implements a serial data protocol to convert serial digital signals received from the corresponding external device to parallel digital signals, which are provided to the control logic; and
   a data converter physical interface comprising one or more data converters, each performing a conversion between analog and digital signals, wherein digital signals associated with the one or more data converters are routed through the switch fabric.

2. The communication system of claim 1, wherein the data converter physical interface comprises:
an analog-to-digital (A/D) physical interface comprising one or more analog-to-digital converters (ADCs), each converting an analog input signal received from an external source into digital signals that are transmitted to the control logic and routed through the switch fabric.

3. The communication system of claim 2, wherein each of the one or more ADCs samples an analog input signal received from an external source to create a digital baseband signal represented by "L" bits, wherein L is greater than one.

4. The communication system of claim 2, wherein the external source comprises a receiver antenna array that receives one or more wireless analog signals, wherein the receiver antenna array is coupled to the one or more ADCs of the A/D physical interface.

5. The communication system of claim 2, wherein the external source comprises a radio frequency signal receiver that provides one or more analog input signals to the one or more ADCs of the A/D physical interface.

6. The communication system of claim 2, wherein the data converter physical interface further comprises:
a digital-to-analog (D/A) physical interface comprising one or more digital-to-analog converters (DACs), each converting digital signals received from the control logic into an analog output signal that is transmitted to a corresponding external destination.

7. The communication system of claim 6, further comprising one or more feedback receivers coupled to receive the one or more analog output signals provided by the one or more DACs, and in response, transmit one or more corresponding analog input signals to one or more corresponding ADCs in the A/D physical interface.

8. The communication system of claim 1, wherein the data converter physical interface comprises:
a digital-to-analog (D/A) physical interface comprising one or more digital-to-analog converters (DACs), each converting digital signals received from the control logic into an analog output signal that is transmitted to a corresponding external destination.

9. The communication system of claim 8, wherein each of the one or more DACs converts a digital baseband signal represented by "L" bits into an analog output signal.

10. The communication system of claim 8, further comprising a transmitter antenna array coupled to the one or more DACs, wherein the transmitter antenna array transmits one or more wireless analog signals in response to one or more analog output signals provided by the one or more DACs.

11. The communication system of claim 8, wherein the external destination comprises a radio frequency signal transmitter coupled to receive one or more analog output signals from the one or more DACs of the D/A physical interface.

12. The communication system of claim 1, wherein one and only one of the one or more transceivers is assigned to a corresponding interface port of the switch.

13. The communication system of claim 1, wherein a plurality of the one or more transceivers are bundled and assigned to a corresponding interface port of the switch.

14. The communication system of claim 1, wherein the control logic supports a plurality of serial interface protocols that control the routing of digital baseband and control signals through the switch fabric.

15. The communication system of claim 1, wherein the switch is located on a radio card, which is coupled to a baseband card having a baseband processor through a backplane or fiber connection.

16. The communication system of claim 1, wherein the transceiver block includes a first transceiver configured to implement a first serial protocol, and a second transceiver configured to implement a second serial protocol, different than the first serial protocol.

17. The communication system of claim 1, wherein the control logic and the one or more transceivers support at least one of the following serial data protocols: serial rapid input/output (SRio) protocol, Ethernet protocol, PCI Express (PCIe) protocol, common public radio interface (CPRI) protocol, and joint electron device engineering council (JEDEC) data converter protocol.

18. A communication system comprising:
a switch that includes:
a switch fabric;
control logic that controls the transmission of digital signals through the switch fabric;
a transceiver block comprising one or more transceivers, each transmitting digital signals between the control logic and a corresponding external device, wherein the transceiver block includes a first transceiver configured to implement a first serial protocol, and a second transceiver configured to implement a second serial protocol, different than the first serial protocol; and
a data converter physical interface comprising one or more data converters, each performing a conversion between analog and digital signals, wherein digital signals associated with the one or more data converters are routed through the switch fabric.

19. The communication system of claim 18, wherein the data converter physical interface comprises:
an analog-to-digital (A/D) physical interface comprising one or more analog-to-digital converters (ADCs), each converting an analog input signal received from an external source into digital signals that are transmitted to the control logic and routed through the switch fabric.

20. The communication system of claim 19, wherein each of the one or more ADCs samples an analog input signal received from an external source to create a digital baseband signal represented by "L" bits, wherein L is greater than one.

21. The communication system of claim 19, wherein the external source comprises a receiver antenna array that receives one or more wireless analog signals, wherein the receiver antenna array is coupled to the one or more ADCs of the A/D physical interface.

22. The communication system of claim 19, wherein the external source comprises a radio frequency signal receiver that provides one or more analog input signals to the one or more ADCs of the A/D physical interface.

23. The communication system of claim 19, wherein the data converter physical interface further comprises:
a digital-to-analog (D/A) physical interface comprising one or more digital-to-analog converters (DACs), each converting digital signals received from the control logic into an analog output signal that is transmitted to a corresponding external destination.

24. The communication system of claim 23, further comprising one or more feedback receivers coupled to receive the one or more analog output signals provided by the one or more DACs, and in response, transmit one or more corresponding analog input signals to one or more corresponding ADCs in the A/D physical interface.

25. The communication system of claim 18, wherein the data converter physical interface comprises:

a digital-to-analog (D/A) physical interface comprising one or more digital-to-analog converters (DACs), each converting digital signals received from the control logic into an analog output signal that is transmitted to a corresponding external destination.

26. The communication system of claim 25, wherein each of the one or more DACs converts a digital baseband signal represented by "L" bits into an analog output signal.

27. The communication system of claim 25, further comprising a transmitter antenna array coupled to the one or more DACs, wherein the transmitter antenna array transmits one or more wireless analog signals in response to one or more analog output signals provided by the one or more DACs.

28. The communication system of claim 25, wherein the external destination comprises a radio frequency signal transmitter coupled to receive one or more analog output signals from the one or more DACs of the D/A physical interface.

29. The communication system of claim 18, wherein one and only one of the one or more transceivers is assigned to a corresponding interface port of the switch.

30. The communication system of claim 18, wherein a plurality of the one or more transceivers are bundled and assigned to a corresponding interface port of the switch.

31. The communication system of claim 18, wherein the control logic supports a plurality of serial interface protocols that control the routing of digital baseband and control signals through the switch fabric.

32. The communication system of claim 18, wherein the switch is located on a radio card, which is coupled to a baseband card having a baseband processor through a backplane or fiber connection.

33. The communication system of claim 18, wherein the transceiver block includes a first transceiver configured to implement a first serial protocol, and a second transceiver configured to implement a second serial protocol, different than the first serial protocol.

34. The communication system of claim 18, wherein the control logic and the one or more transceivers support at least one of the following serial data protocols: serial rapid input/output (SRio) protocol, Ethernet protocol, PCI Express (PCIe) protocol, common public radio interface (CPRI) protocol, and joint electron device engineering council (JEDEC) data converter protocol.

* * * * *